J. EDSON.
Pumps.

No. 143,751.    Patented Oct. 21, 1873.

Witnesses:
George C. Phelps
Horace M. Sproat

Inventor:
Jacob Edson
by Alban Andrén, atty

UNITED STATES PATENT OFFICE.

JACOB EDSON, OF BOSTON, MASSACHUSETTS.

IMPROVEMENT IN PUMPS.

Specification forming part of Letters Patent No. 143,751, dated October 21, 1873; application filed September 18, 1873.

*To all whom it may concern:*

Be it known that I, JACOB EDSON, of Boston, in the county of Suffolk and State of Massachusetts, have invented certain new and useful Improvements in Ships' Pumps; and I do hereby declare the following to be a full, clear, and exact description of the invention, such as will enable others skilled in the art to which it pertains to make and use it, reference being had to the accompanying drawings which form part of this specification.

My invention relates to improvements in ships' pumps, consisting in the employment of a curved beam in combination with a screw-threaded stuffing-box, provided with a side projection, by means of which, and a corresponding projection on the inside of the air-chamber cover, the stuffing-box is prevented from being detached during the working of the pumps. My invention also consists in an improved air-chamber cover, constructed in such a manner as to prevent a certain quantity of air from escaping from the chamber, as well as preventing the air-chamber from being entirely filled with water. Lastly, my invention consists in a movable curved connection-pipe that can easily be placed in communication with the suction-pipe of the pumps, and one of several pipes leading from different parts of a ship, as will now be more fully shown and described.

Figure 1:
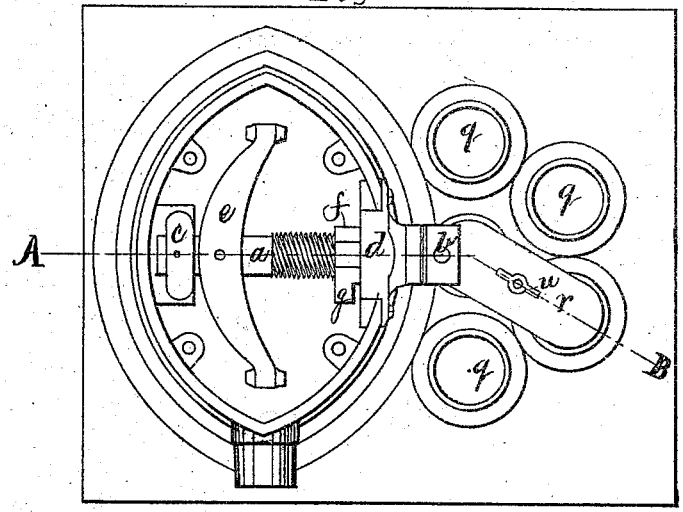
Figure 2:
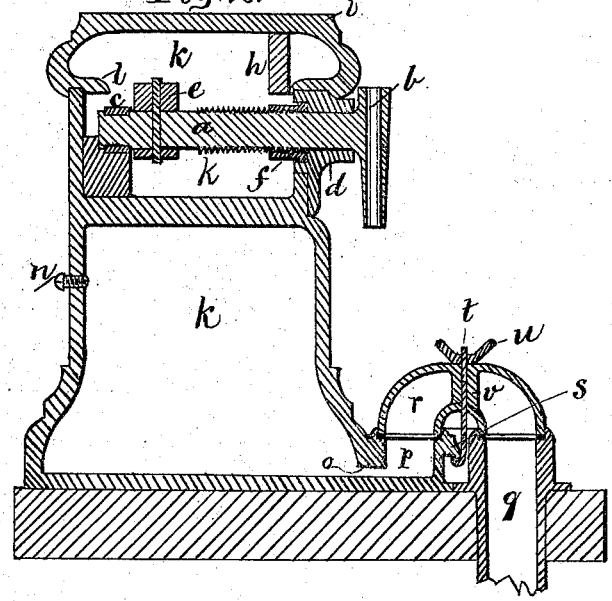
Figure 3:
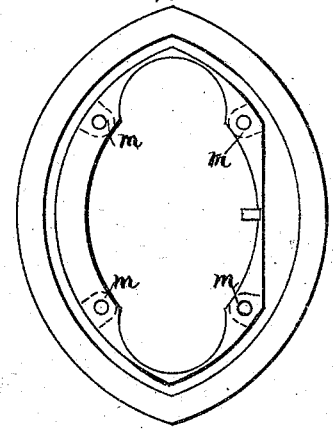

On the drawing, Figure 1 represents a ground plan of my invention without the air-chamber cover. Fig. 2 represents a central longitudinal section of my invention on the line A B shown in Fig. 1; and Fig. 3 represents a ground plan of the air-chamber cover seen from the under side.

Similar letters refer to similar parts wherever they occur on the drawings.

$a$ represents the rocking shaft usually employed to operate ships' pumps. The shaft $a$ is resting in suitable bearings $c\ d$, as shown, and provided in its outer end with a slotted head, $b$, to which the handles are attached by which the pumps are operated. To the rock-shaft $a$ is keyed the pump-beam $e$, as shown. Said beam is curved in a manner represented on Fig. 1, so as to allow the stuffing-box $f$ to be removed from the bearing $d$ when the said box is to be packed. The screw-threaded stuffing-box $f$ is provided on one side with a projecting lip, $g$, which, in combination with another projection, $h$, attached or made in one piece with the cover $i$, prevents the stuffing-box $f$ from working loose from the recessed bearing $d$ during the operation of the pumps. By making the beam $e$ curved, as shown in Fig. 1, I obtain sufficient space between the said beam and the nut $f$, so as to be able to pack the stuffing-box for the shaft $a$ without inconvenience. The cover $i$, for the air-chamber $k$, is provided in its lower end with an inside-projecting flange, $l$, between which and the top are cast projections $m\ m\ m\ m$, through which the bolts that secure the cover $i$ to the frame are inserted. By this improved cover I prevent the air that is above the flange $l$ from being forced out around the bolts, and I am, therefore, always sure of having a certain quantity of air in my air-chamber. This is a great advantage, as accidents often occur from the loss of air in the air-chambers on ships' pumps. The chamber $k$ is provided with a screw, $n$, that can easily be removed for the letting in of air in the said chamber, when required. Close to the bottom of the chamber $k$ is an opening, $o$, leading to a mouth-piece, $p$, shown in Fig. 2. To the deck of the vessel are secured a number of pipes, $q\ q\ q\ q$, leading from different parts of the ship, for the purpose of being able to pump the water from any required place in the ship. The upper ends of the mouth-piece $p$, as well as those of the pipes $q\ q$, are provided with a suitable recess for the reception of a packing-ring. A curved connecting-pipe, $r$, is made in such a manner as to connect from the mouth-piece $p$ to any of the pipes $q\ q\ q\ q$, as may be required. The outer circumference of the mouth-piece $p$ is provided with a projecting flange, $s$, that serves, in combination with a hooked bolt, $t$, and nut $u$, for the purpose of securing the curved connecting-pipe $r$ to the mouth-piece $p$ and any of the pipes $q\ q\ q\ q$. The bolt $t$ projects through a hole in the hub $v$ cast in the pipe $r$, by which arrangement the water is prevented from leaking out around the bolt $t$. By this arrangement I also dispense with the expensive valves or cut-offs formerly used for the purpose of directing the water from one particular part of a ship to the pumps.

Having thus fully described my invention, what I wish to secure by Letters Patent, and claim, is—

1. In combination with the shaft $a$, the stuffing-box $f$, having a lip, $g$, and the stationary projection $h$ on the cover $i$, as and for the purpose set forth.

2. The combination of the curved beam $e$, shaft $a$, and stuffing-box $f$, as and for the purpose set forth.

3. The cover $i$, provided with the projecting flange $l$ and perforated bolt-sockets $m\ m\ m\ m$, as herein set forth and described.

4. The movable induction-tube $r$, in combination with the mouth-piece $p$ and one or more pipes, $q\ q\ q\ q$, as and for the purpose described.

5. In combination with the mouth-piece $p$, flange $s$, and one or more pipes, $q\ q\ q\ q$, the hooked bolt $t$ and nut $u$, or their equivalents, for the purpose herein shown and described.

In testimony that I claim the foregoing I have hereunto set my hand this 11th day of September, 1873.

JACOB EDSON.

Witnesses:
 ALBAN ANDRÉN,
 GEORGE E. PHELPS.